(12) United States Patent
Li et al.

(10) Patent No.: US 8,576,365 B2
(45) Date of Patent: Nov. 5, 2013

(54) DISPLAY PANEL

(75) Inventors: Ming-Chun Li, Taichung (TW); Hong-Ji Huang, Hsinchu (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 461 days.

(21) Appl. No.: 12/909,834

(22) Filed: Oct. 22, 2010

(65) Prior Publication Data
US 2011/0299022 A1 Dec. 8, 2011

(30) Foreign Application Priority Data
Jun. 4, 2010 (TW) .............................. 99118184 A

(51) Int. Cl.
G02F 1/1333 (2006.01)
G02F 1/1343 (2006.01)

(52) U.S. Cl.
USPC ........................................................ 349/141

(58) Field of Classification Search
USPC ................................. 349/141, 143
See application file for complete search history.

(56) References Cited

U.S. PATENT DOCUMENTS

| 6,798,483 B2 | 9/2004 | Lee et al. |
| 7,956,969 B2 * | 6/2011 | Inoue et al. .................... 349/129 |
| 2009/0135342 A1 | 5/2009 | Lee |
| 2009/0278810 A1 * | 11/2009 | Ma et al. ........................ 345/173 |

* cited by examiner

*Primary Examiner* — Eric Wong
(74) *Attorney, Agent, or Firm* — Jianq Chyun IP Office

(57) ABSTRACT

A display panel including a first plate, a second plate, and a spacer and a display medium between the first plate and the second plate is provided. The first plate has a first substrate, a scan line and a data line on the first substrate, an active device electrically connected to the scan line and the data line, a pixel electrode electrically connected to the active device, and a first common electrode electrically insulated from the pixel electrode and alternatively arranged with the pixel electrode. The second plate has a second substrate, a second common electrode on the second substrate and disposed corresponding to the first common electrode of the first plate, and a floating electrode electrically insulated from the second common electrode and disposed corresponding to the pixel electrode of the first plate.

23 Claims, 9 Drawing Sheets

DISPLAY PANEL

CROSS-REFERENCE TO RELATED APPLICATION

This application claims the priority benefit of Taiwan application serial no. 99118184, filed on Jun. 4, 2010. The entirety of the above-mentioned patent application is hereby incorporated by reference herein and made a part of this specification.

BACKGROUND OF THE INVENTION

1. Field of the Present Invention

The invention relates to a display panel. More particularly, the invention relates to a floating electrode switching (FES) display panel.

2. Description of Related Art

Recently, thin film transistor liquid crystal displays (TFT-LCDs) equipped with superior properties such as high contrast ratio, no gray scale inversion, high luminance, high color saturation, high response speed and wide viewing angle have become mainstream display products in the market. At the current stage, LCD panel technologies that have been developed to satisfy the requirement of a wide viewing angle include: twisted nematic (TN) LCD panels equipped with wide viewing films, in-plane switching (IPS) LCD panels, fringe field switching (FFS) LCD panels and multi-domain vertically alignment (MVA) LCD panels.

In addition to said wide viewing angle LCDs, a floating electrode switching (FES) LCD panel is developed. In the FES LCD, a floating electrode and a common electrode are further formed on an upper substrate. Therefore, liquid crystal molecules in the FES LCD panel are controlled by a pixel electrode and a common electrode on a lower substrate and a floating electrode and a common electrode on an upper substrate. However, the voltage level of the floating electrode in the FES LCD panel is induced by capacitance coupling between the floating electrode and the pixel electrode on the lower substrate. If the distance between the floating electrode and the pixel electrode is too large, the capacitance coupling effect between the floating electrode and the pixel electrode is insufficient. As a result, the floating electrode on the upper substrate can not have a sufficient voltage level, and the electric field between the floating electrode and the pixel electrode is not strong enough, such that the liquid crystal molecules near the upper substrate may not be completely twisted.

SUMMARY OF THE INVENTION

The invention provides a display panel capable of increasing capacitance coupling effect between the floating electrode and the pixel electrode in a FES LCD panel.

A display panel including a first plate, a second plate, and a spacer and a display medium between the first plate and the second plate is provided. The first plate has a first substrate, a scan line and a data line on the first substrate, an active device electrically connected to the scan line and the data line, a pixel electrode electrically connected to the active device, and a first common electrode electrically insulated from the pixel electrode and alternatively arranged with the pixel electrode. The second plate has a second substrate, a second common electrode on the second substrate and disposed corresponding to the first common electrode of the first plate, and a floating electrode electrically insulated from the second common electrode and disposed corresponding to the pixel electrode of the first plate.

According to the aforementioned, the spacer is disposed between the first plate and the second plate to reduce the distance between the floating electrode and the pixel electrode. As a result, the capacitance coupling effect between the floating electrode and the pixel electrode is increased, the floating electrode can have a sufficient voltage level, and thereby the electric field between the floating electrode and the pixel electrode is strong enough. Therefore, the problem of the liquid crystal molecules near the upper substrate may not be completely twisted in the conventional FES LCD panel can be resolved.

It is to be understood that both the foregoing general descriptions and the following detailed embodiments are exemplary and are, together with the accompanying drawings, intended to provide further explanation of technical features and advantages of the present invention.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
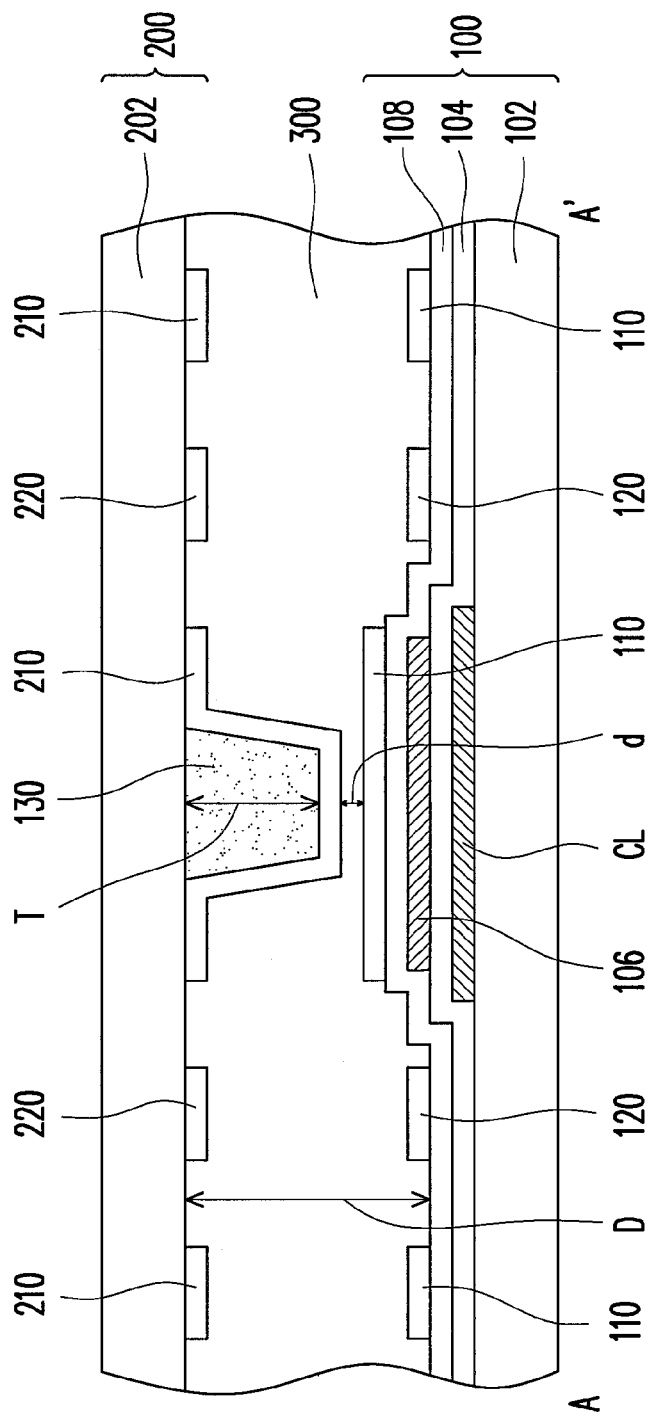
FIG. 1 is a schematic cross-sectional view of a display panel according to an embodiment of the present invention.
Figure 2A:
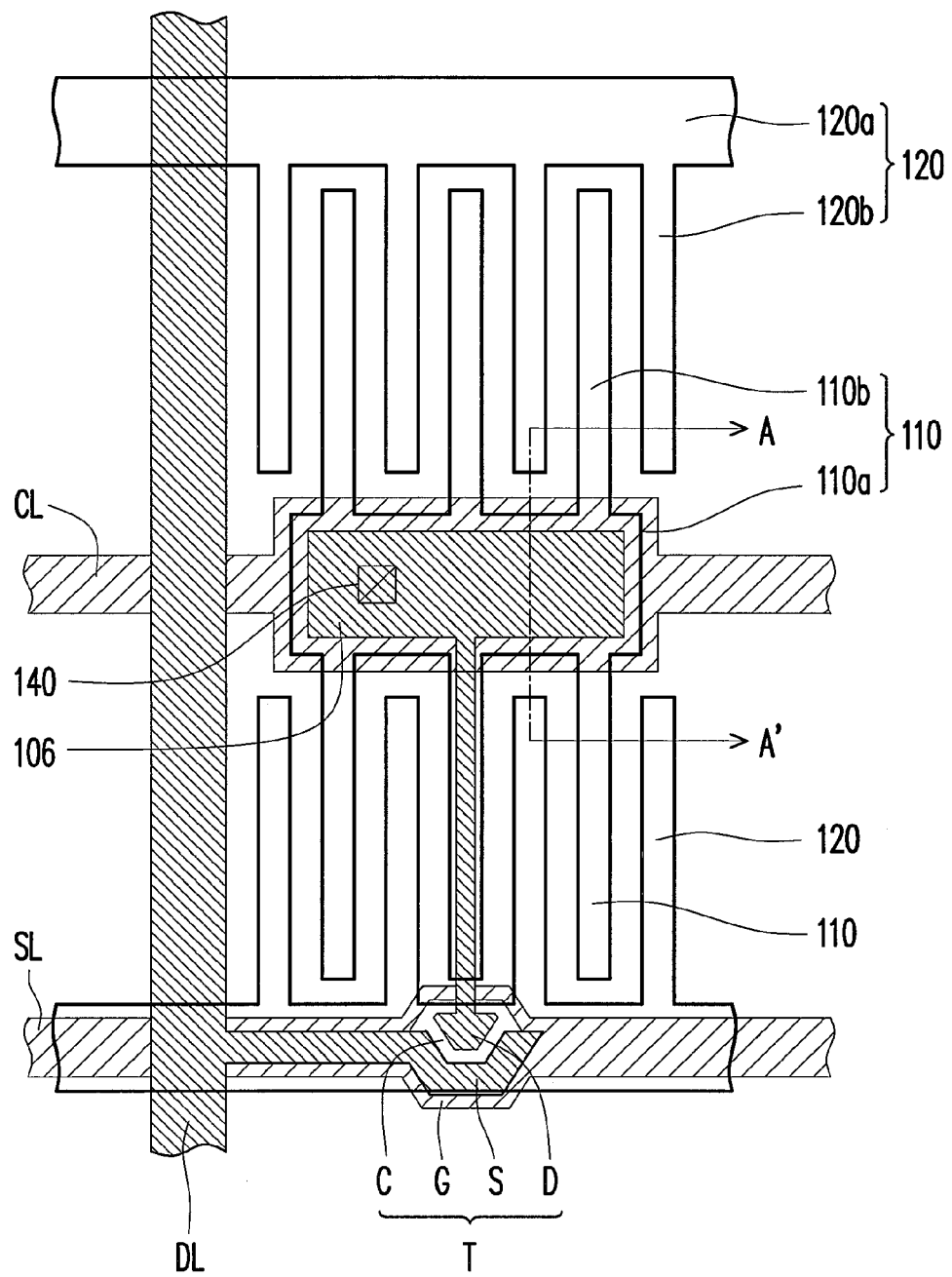
FIG. 2A is a top view of the first plate of the display panel in FIG. 1.
Figure 2B:
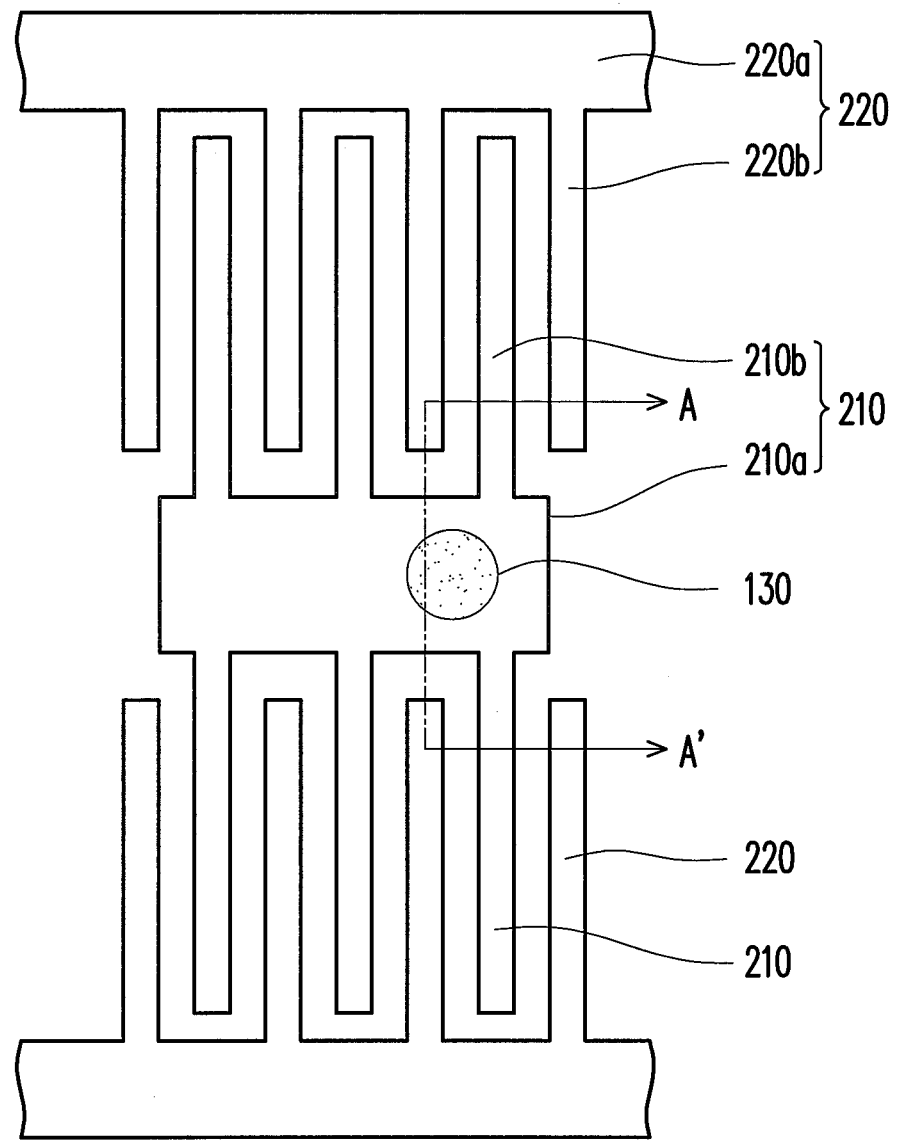
FIG. 2B is a top view of the second plate of the display panel in FIG. 1.

FIG. 1 is a schematic cross-sectional view of a display panel according to an embodiment of the present invention. FIG. 2A is a top view of the first plate of the display panel in FIG. 1. FIG. 2B is a top view of the second plate of the display panel in FIG. 1. FIG. 1 is a cross-sectional view corresponding to the cross-section line A-A' in FIG. 2A and FIG. 2B. It is noted that, one pixel structure of the display panel is shown in the drawings for clear illustration. Generally, a display panel is formed by a plurality of pixel structures arranged in an array, and the people skilled in the art can understand the display panel of the present invention according to the description of the specification and the drawings. With reference to FIG. 1, FIG. 2A and FIG. 2B, the display panel of this embodiment includes a first plate 100, a second plate 200, and a spacer 130 and a display medium 300 between the first plate 100 and the second plate 200.

The first plate 100 comprises a substrate 102, a scan line SL, a data line DL, an active device T, a pixel electrode 110 and a first common electrode 120.

The substrate 102 is used to carry the elements of the first plate 100, and it may comprise glass, quartz, an organic polymer, an opaque/reflective material (such as a conductive material, silicon wafer, ceramics, or other suitable materials) or other suitable materials.

The scan line SL and the data line DL are disposed on the first substrate 102. The scan line SL is disposed crossing over the data line DL. In other words, an extending direction of the data line DL is not parallel to an extending direction of the scan line SL. Moreover, it is favorable for the extending direction of the data line DL to be perpendicular to the extending direction of the scan line SL. In addition, the scan line SL and the data line DL are in different layers. In consideration of electrical conductivity, the scan line SL and the data line DL are normally made of metallic materials. However, the invention is not limited thereto. According to other embodiments, the scan line SL and the data line DL may also adopt other conductive materials, for example, an alloy, a metal nitride material, a metal oxide material, a metal oxynitride material, or other suitable materials, or a stacked conductive layer.

The active device T is electrically connected to the scan line SL and the data line DL. Specifically, the active device T includes a gate G, a channel C, a source S, and a drain D. The gate G is electrically connected to the scan line SL. The channel C is located above the gate G. The source S and the drain D are located above the channel C, and the source S is electrically connected to the data line DL. The active device T is a bottom gate thin film transistor for illustration, but it is not limited in the present invention. According to other embodiments, the active device T can also be a top gate TFT. According to the embodiment, an insulating layer 104 is further formed on the gate G of the active device T, and it is referred to as a gate insulating layer. In addition, another insulating layer 108 is further formed on the active device T, and it is referred to as a passivation layer. The insulating layers 104, 108 respectively comprise an inorganic material (e.g. silicon oxide, silicon nitride, silicon oxynitride, other suitable materials, or a stacked layer of the above materials), an organic material, or a combination of the above.

The pixel electrode 110 is disposed on the first substrate 102 and electrically connected to the drain D of the active device T. The pixel electrode 110 is disposed on the insulating layer 108 and electrically connected to the drain D of the active device T through the contact window 140. The pixel electrode 110 is a transparent conductive layer comprising a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials.

The first common electrode 120 is disposed on the first substrate 102 and electrically insulated from the pixel electrode 110. In particular, the first common electrode 120 and the pixel electrode 110 are alternatively arranged to each other. The first common electrode 120 is a transparent conductive layer comprising a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials.

According to the embodiment, the pixel electrode 110 and the first common electrode 120 respectively have a branch-shaped pattern. In details, as shown in FIG. 2A, the pixel electrode 110 is comprised of a middle portion 110a disposed above the upper electrode 106 (in the middle of the pixel structure) and a plurality of branch portions 110b extending from the middle portion 110a to the edge of the pixel structure. The first common electrode 120 is comprised of a connecting portion 120a disposed in the edge of the pixel structure and a plurality of branch portions 120b extending from the connecting portion 120a to the middle of the pixel structure. In particular, the branch portions 110b of the pixel electrode 110 and the branch portions 120b the first common electrode 120 are parallel and alternatively arranged to each other.

In one embodiment of the present invention, the first plate 100 further includes a common electrode line CL located under the pixel electrode 110. The common electrode line CL is mainly used as a lower electrode of a capacitor. Moreover, an upper electrode 106 further is formed between the common electrode line CL and the pixel electrode 110, and the pixel electrode 110 is electrically connected to the upper electrode 106 through the contact window 140. The upper electrode 106, the common electrode line CL and a dielectric layer (such as the insulating layer 104) between the upper electrode 106 and the common electrode line CL constitute a storage capacitor. In the present embodiment, the drain D of the active device T extends to above the common electrode line CL to connect with the upper electrode 106, and the pixel electrode 110 is electrically connected to the upper electrode 106 through the contact window 140. Hence, driving signals passing the active device T are transmitted to the pixel electrode 110 through the upper electrode 106 and the contact window 140 and are stored in the storage capacitor formed by the upper electrode 106 and the common electrode line CL.

The second plate 200 comprises a second substrate 202, a second common electrode 220 and a floating electrode 210.

The second substrate 202 is used to carry the elements of the second plate 200, and it may comprise glass, quartz, an organic polymer, a opaque/reflective material (such as a conductive material, silicon wafer, ceramics, or other suitable materials) or other suitable materials.

The second common electrode 220 is disposed on the second substrate 202 and disposed corresponding to the first common electrode 120 of the first plate 100. More specifically, the second common electrode 220 is disposed aligning to/overlapping with the first common electrode 120, and thus the second common electrode 220 has a pattern the same to that of the first common electrode 120. According to the embodiment, the second common electrode 220 has a branch-shaped pattern. In details, as shown in FIG. 2B, the second common electrode 220 is comprised of a connecting portion 220a disposed in the edge of the pixel structure and a plurality of branch portions 220b extending from the connecting portion 220a to the middle of the pixel structure. The second common electrode 220 is a transparent conductive layer comprising a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials. In an embodiment, the first common electrode 120 and the second common electrode 220 are electrically connected to a common voltage.

The floating electrode 210 is disposed on the second substrate 202 and electrically insulated from the second common electrode 220. In particular, the floating electrode 210 is disposed corresponding to the pixel electrode 110 of the first plate 100. More specifically, the floating electrode 210 is disposed aligning to/overlapping with the pixel electrode 110, and thus the floating electrode 210 has a pattern the same to that of the pixel electrode 110. According to the embodiment, the floating electrode 210 has a branch-shaped pattern. In details, as shown in FIG. 2B, the floating electrode 210 is comprised of a middle portion 210a disposed in the middle of the pixel structure and a plurality of branch portions 210b extending from the middle portion 210a to the edge of the pixel structure, that is the branch portions 210b extend outward from the middle portion 210a. Therefore, the branch portions 210b of the floating electrode 210 and the branch portions 220b of the second common electrode 220 are alternatively arranged and parallel to each other. The floating electrode 210 is a transparent conductive layer comprising a metal oxide, such as indium tin oxide (ITO), indium zinc oxide (IZO), aluminum zinc oxide (AZO), aluminum tin oxide (ATO), indium zinc tin oxide (ITZO), other suitable materials, or a stacked layer of above materials.

The display medium 300 can include liquid crystal molecules, an electrophoretic display medium or other suitable display mediums. In the embodiments of the present invention, the display medium comprises liquid crystal molecules for illustration, but it does not limit the present invention. In addition, the liquid crystal molecules in the embodiments are liquid crystal molecules which may be twisted or switched by a horizontal electric field or a lateral electric field for or illustration, but the present invention is not limited herein.

The spacer 130 is disposed between the first plate 100 and the second plate 200. In the embodiment of FIG. 1, the spacer 130 is disposed on the second substrate 202, and the floating electrode 210 may cover the spacer 130. Herein, the material used for fabricating the spacer 130 is, for example, a photosensitive organic material. According to the embodiment, the thickness T of the spacer 130 is 3~4 um. The gap d between the floating electrode 210 covering the spacer 130 and the pixel electrode 110 is 0~2 um. In an embodiment, the gap d between the floating electrode 210 covering the spacer 130 and the pixel electrode 110 is less than a cell gap D between the first plate 100 and the second plate 200. The spacer 130 may at least partially overlap with the middle portion 210a and does not overlap with the branch portions 210b. The spacer 130 may at least partially overlap with the pixel electrode 110.

In the embodiment, the spacer 130 is disposed on the second substrate 202 to reduce the distance between the floating electrode 210 and the pixel electrode 110. Because the distance between the floating electrode 210 and the pixel electrode 110 is reduced, the capacitance coupling effect between the floating electrode 210 and the pixel electrode 110 is increased, and thereby the floating electrode 210 can have a sufficient voltage level. As a result, the electric field between the floating electrode 210 and the pixel electrode 110 is strong enough so as to control the twist of the liquid crystal molecules 300 near the second plate 200.

In the embodiment of FIG. 1, the spacer 130 is disposed on the second substrate 202 to reduce the distance between the floating electrode 210 and the pixel electrode 110, so as to increase the capacitance coupling effect between the floating electrode 210 and the pixel electrode 110. However, the invention is not limited thereto. The present invention can also be practiced with other embodiments.

Figure 3:
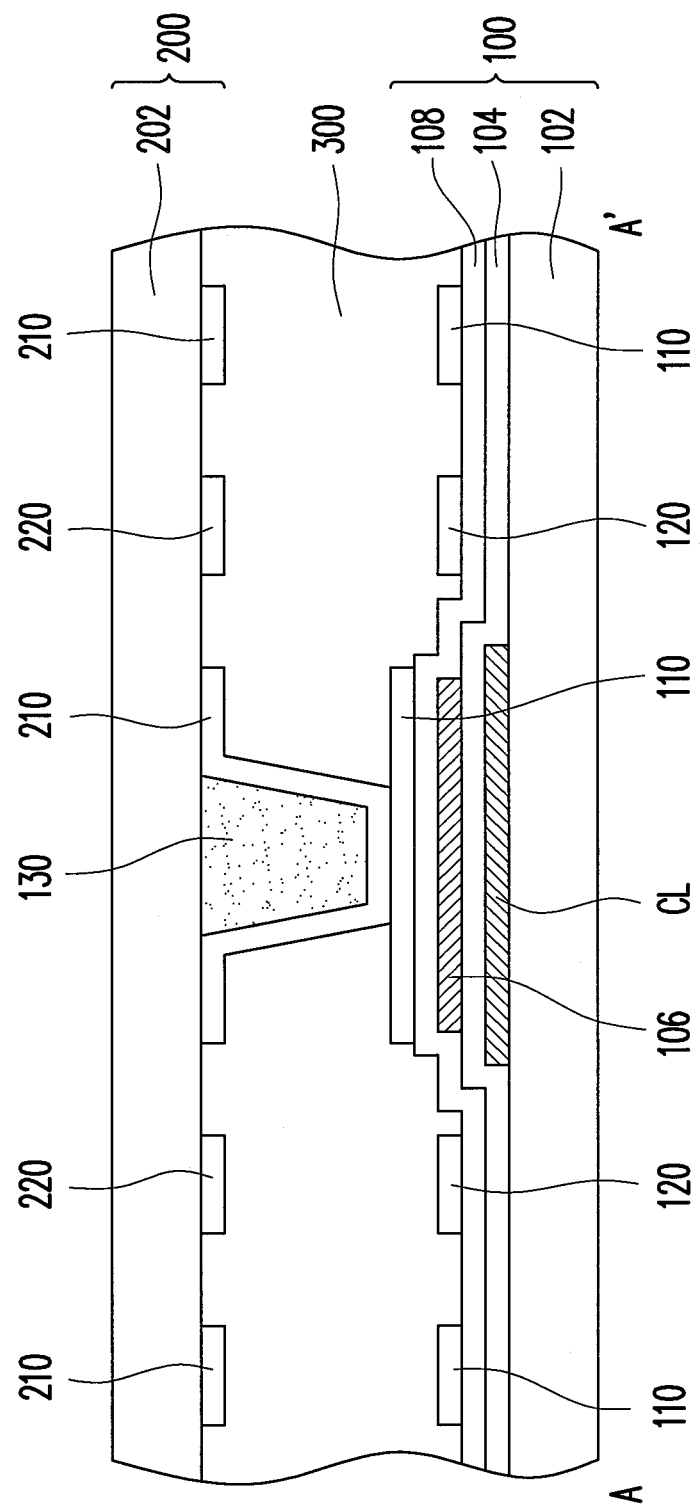
FIG. 3 to FIG. 7 are schematic cross-sectional views of a display panel according to embodiments of the present invention.

FIG. 3 is a schematic cross-sectional view of a display panel according to another embodiment of the present invention. Referring to FIG. 3, the embodiment shown in FIG. 3 is similar to the embodiment shown in FIG. 1 so that components identical to those of FIG. 1 will be denoted with the same numerals and not repeated herein. The difference between the embodiment of FIG. 3 and the embodiment of FIG. 1 is that the floating electrode 210 covering the spacer 130 directly contacts the pixel electrode 110. In other words, there is no gap (gap is 0) between the floating electrode 210 and the pixel electrode 110. Therefore, the floating electrode 210 directly contacts with the pixel electrode 110, and the floating electrode 210 and the pixel electrode 110 have the same electric potential. As a result, the electric field between the floating electrode 210 and the pixel electrode 110 is strong enough so as to control the twist of the liquid crystal molecules 300 near the second plate 200.

Figure 4:
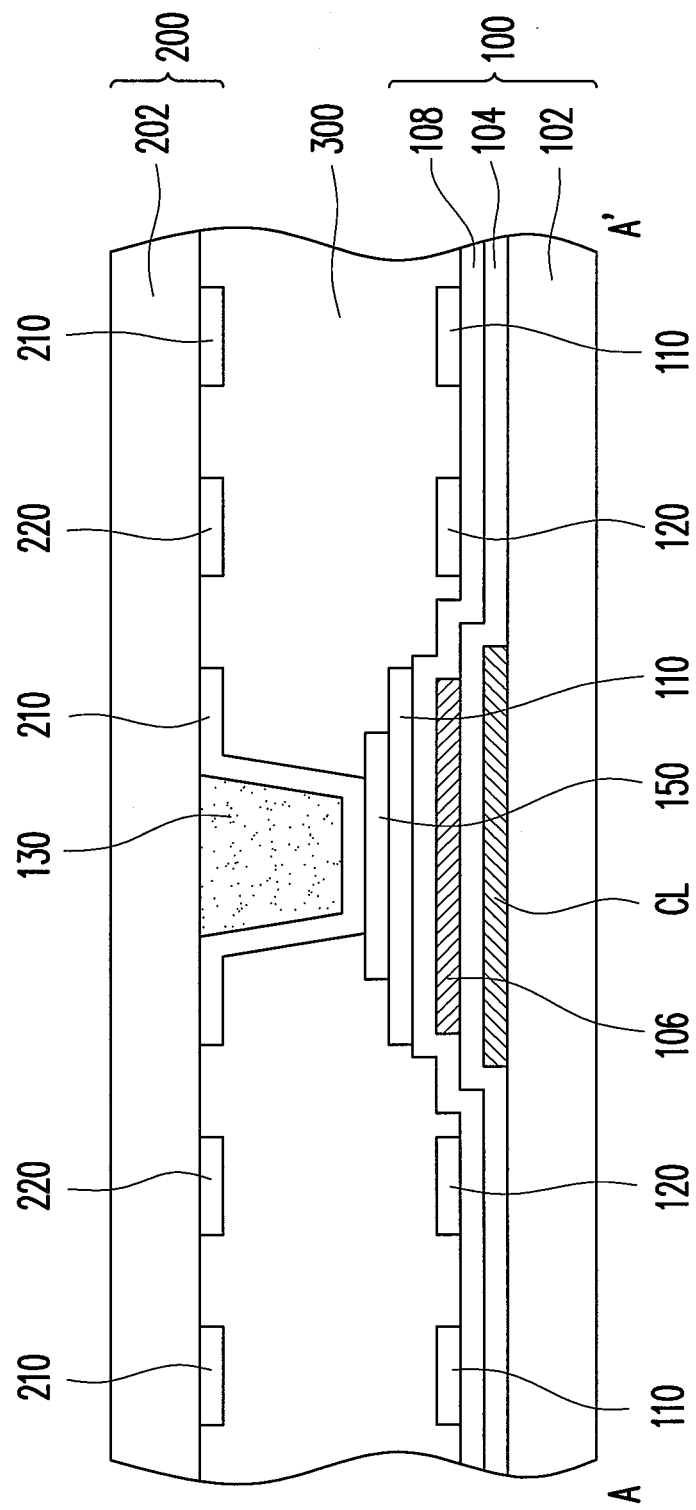

FIG. 4 is a schematic cross-sectional view of a display panel according to another embodiment of the present invention. Referring to FIG. 4, the embodiment shown in FIG. 4 is similar to the embodiment shown in FIG. 1 so that components identical to those of FIG. 1 will be denoted with the same numerals and not repeated herein. The difference between the embodiment of FIG. 4 and the embodiment of FIG. 1 is that in the embodiment of FIG. 4, an insulating layer 150 is further disposed between and substantially overlapped with the pixel electrode 110 and the floating electrode 210 covering the spacer 130. In the embodiment, the insulating layer 150 is formed on the first substrate 102 to cover the pixel electrode 110. The insulating layer 150 comprises a dielectric material having a high dielectric constant. The floating electrode 210 covering the spacer 130 directly contacts to the insulating layer 150. In the embodiment, the insulating layer 150 is between the floating electrode 210 and the pixel electrode 110, capacitance coupling between the floating electrode 210 and the pixel electrode 110 is increased through the effect of high dielectric constant of the insulating layer 150. In other words, the floating electrode 210 can have a sufficient voltage level. As a result, the electric field between the floating electrode 210 and the pixel electrode 110 is strong enough so as to control the twist of the liquid crystal molecules 300 near the second plate 200.

Figure 5:
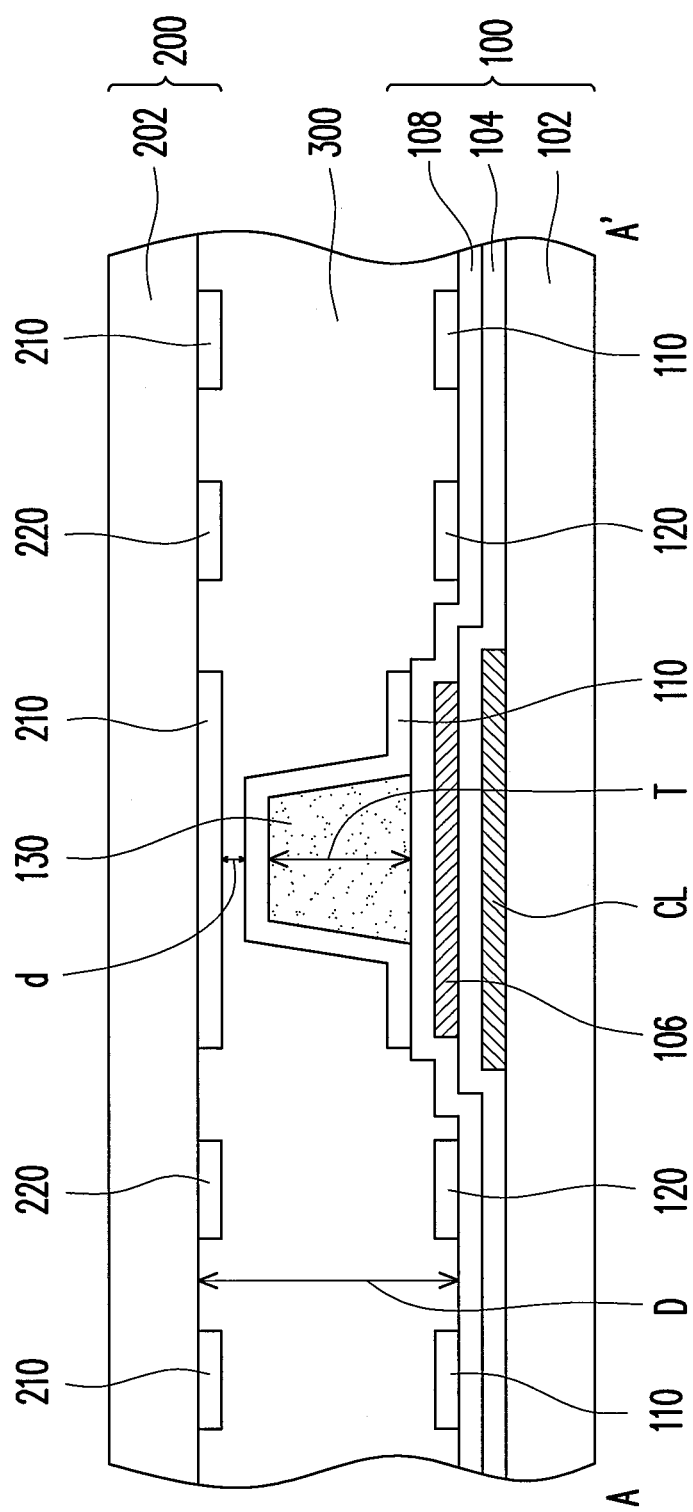

FIG. 5 is a schematic cross-sectional view of a display panel according to another embodiment of the present invention. Referring to FIG. 5, the embodiment shown in FIG. 5 is similar to the embodiment shown in FIG. 1 so that components identical to those of FIG. 1 will be denoted with the same numerals and not repeated herein. The difference between the embodiment of FIG. 5 and the embodiment of FIG. 1 is that the spacer 130 is disposed on the first substrate 102, and the pixel electrode 110 covers the spacer 130. Similarly, the thickness of the spacer 130 is 3~4 um. The gap d between the pixel electrode 110 covering the spacer 130 and the floating electrode 210 is 0~2 um. In an embodiment, the gap d between the pixel electrode 110 covering the spacer 130 and the floating electrode 210 is less than a cell gap D between the first plate 100 and the second plate 200.

Figure 6:
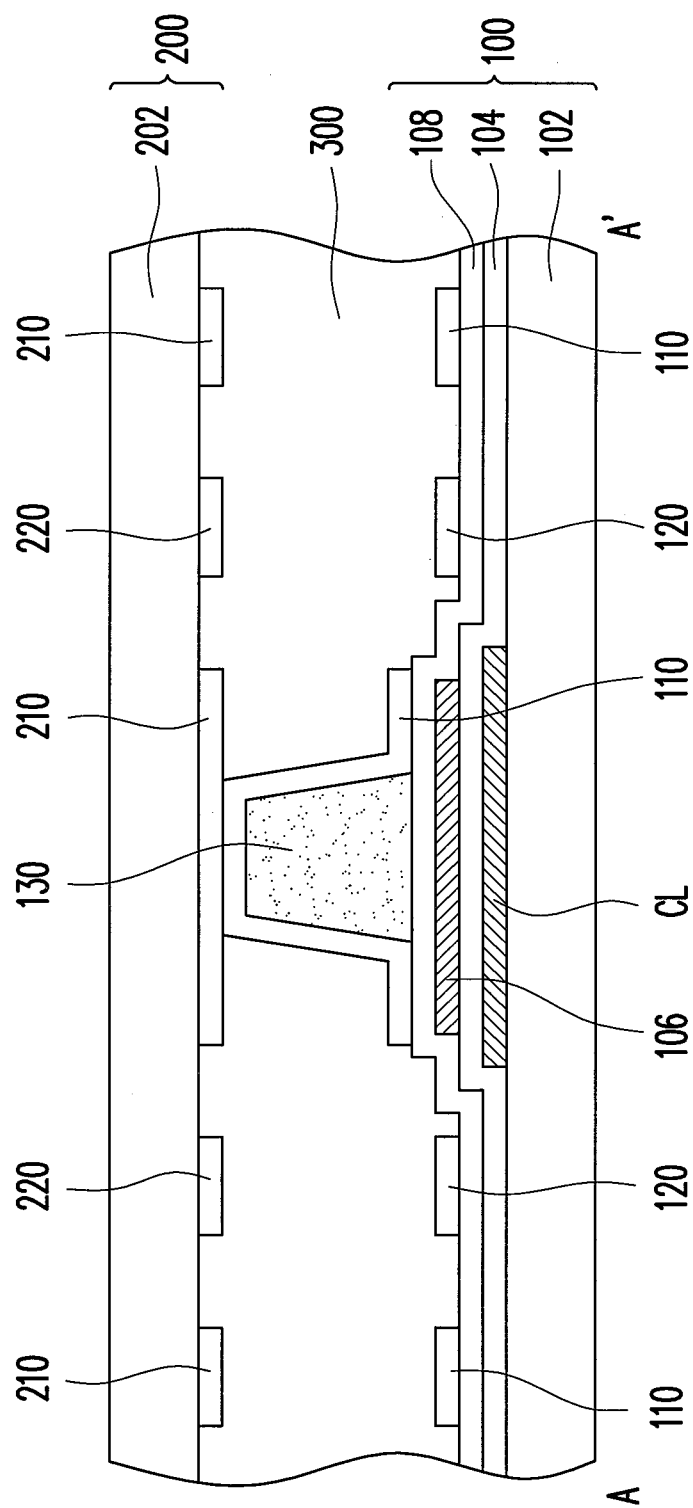

FIG. 6 is a schematic cross-sectional view of a display panel according to another embodiment of the present invention. Referring to FIG. 6, the embodiment shown in FIG. 6 is similar to the embodiment shown in FIG. 5 so that components identical to those of FIG. 5 will be denoted with the same numerals and not repeated herein. The difference between the embodiment of FIG. 6 and the embodiment of FIG. 5 is that the pixel electrode 110 covering the spacer 130 directly contacts the floating electrode 210. In other words, there is no gap (gap is 0) between the floating electrode 210 and the pixel electrode 110. Therefore, the floating electrode 210 directly contacts the pixel electrode 110, and the floating electrode 210 and the pixel electrode 110 have the same electric potential. As a result, the electric field between the floating electrode 210 and the pixel electrode 110 is strong enough so as to control the twist of the liquid crystal molecules 300 near the second plate 200.

Figure 7:
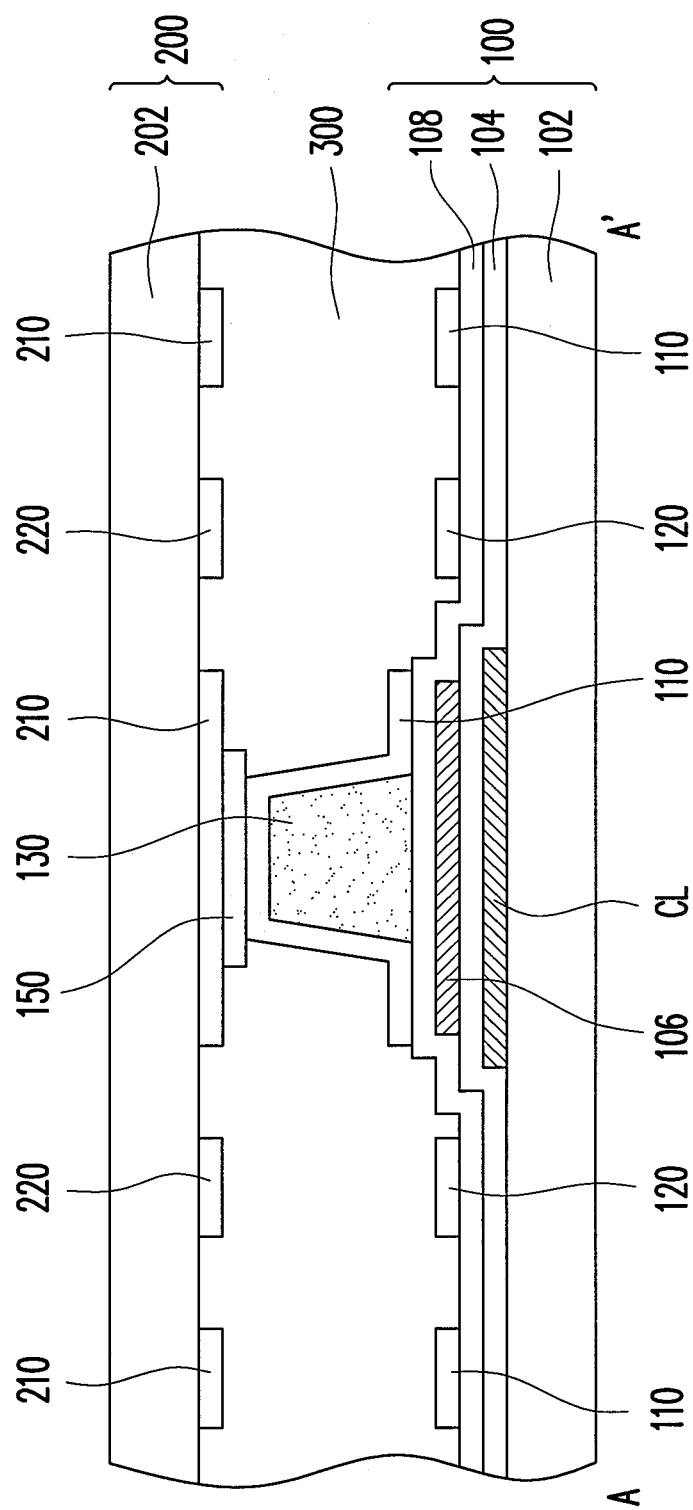

FIG. 7 is a schematic cross-sectional view of a display panel according to another embodiment of the present invention. Referring to FIG. 7, the embodiment shown in FIG. 7 is similar to the embodiment shown in FIG. 5 so that components identical to those of FIG. 5 will be denoted with the same numerals and not repeated herein. The difference between the embodiment of FIG. 7 and the embodiment of FIG. 5 is that an insulating layer 150 is further disposed between the floating electrode 210 and the pixel electrode 110 covering the spacer 130. In the embodiment, the insulating layer 150 is formed on the second substrate 202 to cover the floating electrode 210. The insulating layer 150 comprises a dielectric material having a high dielectric constant. The pixel electrode 110 covering the spacer 130 directly contacts the insulating layer 150. In the embodiment, the insulating layer 150 is between the floating electrode 210 and the pixel electrode 110, capacitance coupling between the floating electrode 210 and the pixel electrode 110 is increased through the effect of high dielectric constant of the insulating layer 150. In other words, the floating electrode 210 can have a sufficient voltage level. As a result, the electric field between the floating electrode 210 and the pixel electrode 110 is strong enough so as to control the twist of the liquid crystal molecules 300 near the second plate 200.

Figure 8:
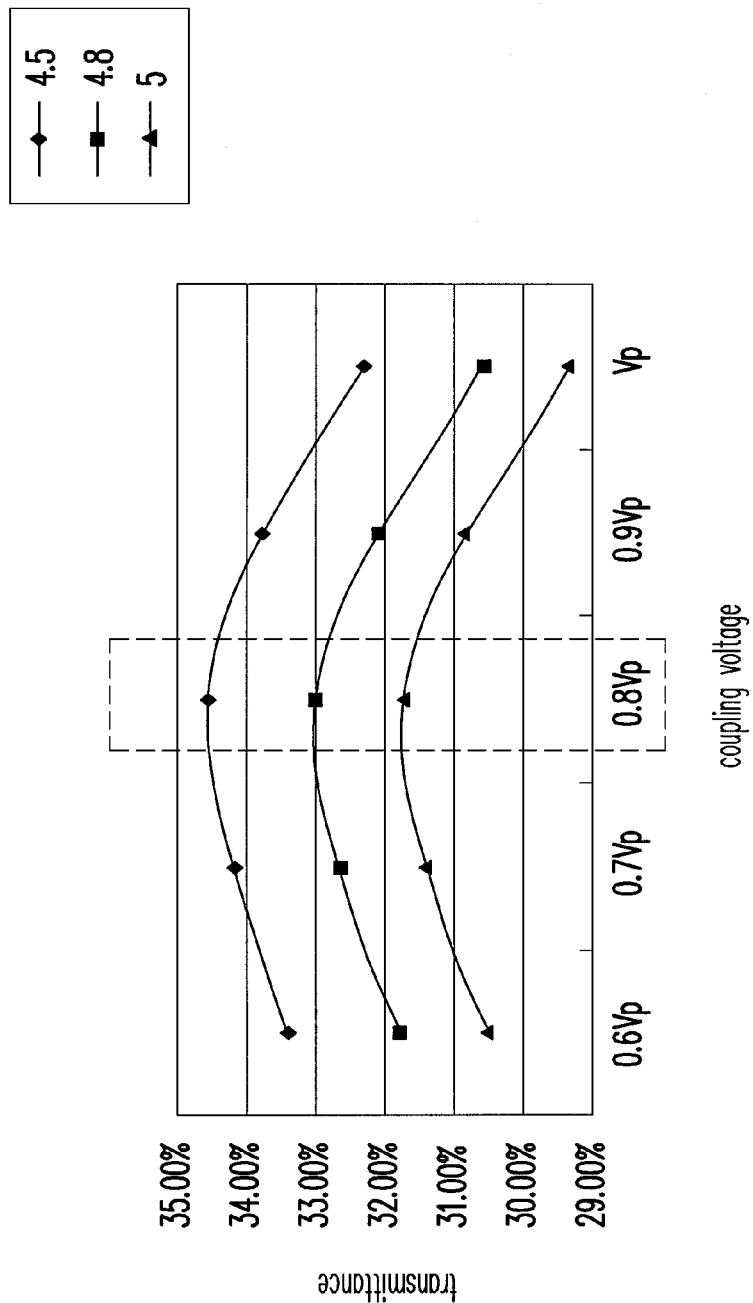
FIG. 8 is a drawing showing the relation of the coupling voltage and the panel transmittance of a display panel according to an embodiment of the present invention.

FIG. 8 is a drawing showing the relation of the coupling voltage and the panel transmittance of a display panel according to an embodiment of the present invention. Referring to FIG. 8, the ratio of the width and the space of the pixel electrode and the first common electrode in the display panel is 3/5, and 4.5, 4.8, 5 represent the voltage input to the pixel electrode. As shown in FIG. 8, when the coupling voltage of the floating electrode is 0.8 of the voltage of the pixel electrode (Vp), a better panel transmittance is obtained.

In the present invention, the spacer is disposed on the first plate or the second plate, and the spacer is covered by the floating electrode or the pixel electrode. In other words, the distance between the floating electrode and the pixel electrode is reduced through the spacer. As a result, the capacitance coupling effect between the floating electrode and the pixel electrode is increased, and the floating electrode can have a sufficient voltage level, such that the electric field between the floating electrode and the pixel electrode is strong enough. Therefore, the problem of the liquid crystal molecules near the upper substrate may not be completely twisted in the conventional FES LCD panel can be resolved.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:
1. A display panel, comprising:
   a first plate, comprising:
      a first substrate;
      a scan line and a data line, disposed on the first substrate;
      an active device, electrically connected to the scan line and the data line;
      a pixel electrode electrically connected to the active device; and
      a first common electrode, electrically insulated from the pixel electrode and alternatively arranged with the pixel electrode; and
   a second plate, comprising:
      a second substrate;
      a second common electrode having a plurality of branch portions, disposed on the second substrate and disposed corresponding to the first common electrode of the first plate; and
      a floating electrode having a plurality of branch portions, electrically insulated from the second common electrode and disposed corresponding to the pixel electrode of the first plate, wherein the plurality of branch portions of the floating electrode and that of the second common electrode are alternatively arranged;
   a spacer disposed between the first plate and the second plate; and
   a display medium located between the first plate and the second plate.

2. The display panel of claim 1, wherein the floating electrode covers the spacer.

3. The display panel of claim 2, wherein a thickness of the spacer is approximately 3~4 um.

4. The display panel of claim 3, wherein a gap is between the floating electrode covering the spacer and the pixel electrode, and the gap is approximately 0~2 um.

5. The display panel of claim 4, wherein the gap between the floating electrode covering the spacer and the pixel electrode is less than a cell gap between the first plate and the second plate.

6. The display panel of claim 3, wherein the floating electrode covering the spacer directly contacts the pixel electrode.

7. The display panel of claim 3, further comprising an insulating layer disposed between the pixel electrode and the floating electrode covering the spacer.

8. The display panel as claimed in claim 1, wherein the spacer is located on the first substrate.

9. The display panel of claim 8, wherein the pixel electrode covers the spacer and a thickness of the spacer is approximately 3~4 um.

10. The display panel of claim 9, wherein a gap is between the pixel electrode covering the spacer and the floating electrode, and the gap is approximately 0~2 um.

11. The display panel of claim 10, wherein the gap between the pixel electrode covering the spacer and the floating electrode is less than a cell gap between the first plate and the second plate.

12. The display panel of claim 9, wherein the pixel electrode covering the spacer directly contacts the floating electrode.

13. The display panel of claim 9, further comprising an insulating layer disposed between the floating electrode and the pixel electrode covering the spacer.

14. The display panel of claim 1, wherein the pixel electrode has a pattern the same to that of the floating electrode.

15. The display panel of claim 14, wherein the pixel electrode and the floating electrode respectively have a branch-shaped pattern.

16. The display panel of claim 1, wherein the first common electrode has a pattern the same to that of the second common electrode.

17. The display panel of claim 16, wherein the first common electrode and the second common electrode respectively have a branch-shaped pattern.

18. The display panel of claim 1, wherein the first common electrode and the second common electrode are electrically connected to a common voltage.

19. The display panel of claim 1, wherein the floating electrode comprises:
   a middle portion, wherein the branch portions of the floating electrode extend outward from the middle portion, wherein the spacer at least partially overlaps with the middle portion and does not overlap with the branch portions of the floating electrode.

20. The display panel of claim 1, wherein the spacer at least partially overlaps with the pixel electrode.

21. The display panel of claim 1, wherein the floating electrode is aligning to the pixel electrode.

22. The display panel of claim 1, wherein the floating electrode is overlapping to the pixel electrode.

23. The display panel of claim 1, wherein the second common electrode is aligning to the first common electrode.

* * * * *